United States Patent [19]

Fischer

[11] Patent Number: 4,557,639
[45] Date of Patent: Dec. 10, 1985

[54] CUTTING TOOL FOR PLANING GEAR TOOTH FLANKS

[75] Inventor: Rudolf Fischer, Mutschellen, Switzerland

[73] Assignee: Maag Gear-wheel & Machine Company Limited, Zürich, Switzerland

[21] Appl. No.: 579,474

[22] Filed: Feb. 13, 1984

[30] Foreign Application Priority Data

Feb. 18, 1983 [CH] Switzerland ............................ 925/83

[51] Int. Cl.$^4$ ........................... B23F 5/16; B23C 5/20
[52] U.S. Cl. ......................................... 407/20; 407/17; 407/25; 407/113; 407/119
[58] Field of Search ....................... 407/15, 16, 17, 20, 407/25, 27, 28, 29, 119; 409/97

[56] References Cited

U.S. PATENT DOCUMENTS

| Re. 28,239 | 11/1974 | Dupuis | 407/17 |
| Re. 28,896 | 7/1976 | Gleason | 407/69 |
| 1,480,610 | 1/1924 | Harten | 407/20 |
| 2,392,823 | 1/1946 | Lapointe | 407/17 |
| 3,564,683 | 2/1971 | Schedler et al. | 407/119 |
| 3,909,895 | 10/1975 | Abrahamson | 407/119 |
| 4,140,042 | 2/1979 | Demuth et al. | 409/47 |
| 4,274,766 | 6/1981 | Raupp, Jr. et al. | 407/15 |

FOREIGN PATENT DOCUMENTS

| 1123205 | 5/1982 | Canada | 407/119 |
| 1135730 | 8/1962 | Fed. Rep. of Germany | 409/27 |
| 0044293 | 4/1979 | Japan | 407/119 |

Primary Examiner—Francis S. Husar
Assistant Examiner—William E. Terrell
Attorney, Agent, or Firm—Werner W. Kleeman

[57] ABSTRACT

Two cutting tool inserts are fastened at each side of a cutting tool insert holder to have their active primary cutting edges aligned. A third cutting tool insert is displaced in relation to the other two cutting tool inserts in the cutting direction such that its active primary cutting edge overlaps in extent the active primary cutting edges of the two aligned cutting tool inserts. This produces an effective total length of the cutting edges which corresponds to the sum of the edge lengths of the three cutting tool inserts less the two overlapping regions. Should one of the cutting tool inserts chip or break off in the region of the overlapping active primary cutting edges, the planing or shaping of hardened gear tooth flanks of a roughed-out gear blank or workpiece can nevertheless be continued since such chipping of the cutting edge has no detrimental influence on the workpiece due to the overlapping.

10 Claims, 6 Drawing Figures

CUTTING TOOL FOR PLANING GEAR TOOTH FLANKS

BACKGROUND OF THE INVENTION

The present invention broadly relates to cutting tools and, more specifically, pertains to a new and improved construction of a cutting tool for planing or shaping the flanks of hardened gear teeth.

Generally speaking, the cutting tool of the present invention for planing or shaping gear tooth flanks on a roughed-out or pre-formed gear blank or workpiece is of the type comprising a cutting tool insert holder and a plurality of cutting tool inserts fastened to the holder.

More specifically, the invention relates to a cutting tool of the aforementioned type in which the cutting tool inserts are formed according to the commonly, assigned related U.S. patent application Ser. No. 06/459,358, filed by Bloch et al on Jan. 19, 1983. These cutting tool inserts comprise a base or support layer of hard metal and a sintered surface or cover layer of very hard polycrystalline cutting material and are oriented in relation to the cutting direction such that the surface of the surface or cover layer forms a free or clearance surface and only one of the side surfaces of the surface or cover layer lies in the cutting surface or plane.

Cutting tools employing cutting tool inserts made according to the aforementioned patent application have proven to be exceptionally good; in particular, they have made it possible to plane or machine hardened gear tooth flanks for the first time. The cutting tool inserts have an unexpectedly long service time between rotation or exchange, so that even gears with a large number of teeth can usually be planed or shaped in a single operation without having to turn the cutting tool inserts or exchange them. Problems have, however, arisen in planing gear teeth having a module greater than 8 since the only cutting tool inserts available up to now are too small to be able to plane gear teeth having a module greater than 8 in hobbing procedure.

Applicant has therefore produced cutting tools of the aforementioned type in which a plurality of cutting tool inserts are fastened to the cutting tool insert holder in adjacent abutting relationship without interstitial gaps and with their active primary cutting edges aligned. In this way, a cutting tool is obtained whose total cutting edge length is sufficient to hob gear tooth flanks having a module greater than 8.

The machining results obtained with these tools are, however, not completely satisfactory, since the cutting tool inserts, in spite of the joint between neighboring cutting tool inserts being made as near as possible to zero width, tend to chip or break off in the region of those joints sooner or later. Even chips which are hardly visible to the naked eye can increase the cutting pressure or force to such an extent that the cutting tool insert holder or the gear tooth which it is cutting, or both, elastically deform and give rise to inaccuracies. These inaccuracies render the gear teeth hobbed in this manner unusable without further processing. They require the provision of a greater grinding allowance for subsequent smooth or finish grinding.

Due to the nevertheless considerable durability of the cutting tool inserts, their employment in the place of rough grinding can still be economical for gear teeth having a module greater than 8 even when the cutting tool has to be rotated, sharpened or exchanged during a revolution of the workpiece. It is however difficult and time-consuming to adjust the rotated, sharpened or exchanged cutting tool to a sufficient degree of precision that the machined accuracy of the workpiece does not suffer due to the change. For this reason as well, an increased grinding allowance has heretofore had to be made for the subsequent finish grinding.

SUMMARY OF THE INVENTION

Therefore, with the foregoing in mind it is a primary object of the present invention to provide a new and improved construction of a cutting tool insert holder which does not have associated with it the aforementioned drawbacks and short comings of the prior art constructions.

Another and more specific object of the present invention aims at providing a new and improved construction of a cutting tool of the previously mentioned type with which the considerable temporal advantages heretofore achieved in relation to rough-grinding for gear teeth up to module 8 can also be realized with gear teeth having a greater module with none of the aforementioned restrictions.

Yet a further significant object of the present invention aims at providing a new and improved construction of a cutting tool of the character described which is relatively simple in construction and design, extremely economical to manufacture, highly reliable in operation, not readily subject to breakdown or malfunction and requires a minimum of maintenance and servicing.

These objects are met by the invention by arranging two cutting tool inserts to be mutually displaced in the cutting direction such that their active primary cutting edges formed by the junction of their cutting faces or surfaces and their free or clearance faces or surfaces overlap one another. This feature "mutually displaced in the cutting direction" means that the active primary cutting edges of the corresponding cutting tool inserts lie at least approximately parallel to one another in a common plane which also contains the cutting direction.

The cutting tool inserts of the tool according to the invention surprisingly do not tend to chip or break off or crumble at the ends of their cutting edges when, in planing, the hobbing motion or action between the tool and the workpiece passes over these ends. Unexpectedly, the mutually displaced cutting tool inserts are more resistant to chipping or breaking-off than cutting tool inserts which intimately abut. Should, however, one of the cutting tool inserts prematurely chip or break-off at an end of its active primary cutting edge, this will not have a detrimental effect on chip removal due to the overlapping of the primary cutting edges of neighboring cutting tool inserts.

As a result of the overlapping, the corresponding flanks of the gear teeth of the workpiece remain free of any detrimental irregularities. The grinding allowance for finish grinding can therefore be as small as it has been in heretofore employed methods in which rough grinding, which is very slow in comparison with the planing operation of the invention, precedes finish grinding.

It has proven practical to arrange the cutting tool inserts such that the overlap of the mutually displaced cutting edges amounts to from 0.5 mm to 6 mm and preferably from 1 mm to 2 mm.

If more than two cutting tool inserts must be arranged in sequence in order to provide a total length required for the hobbing or planing of a high or tall gear tooth flank, then these cutting tool inserts can be sequentially arranged in a stepped fashion. In the preferred embodiment of the invention, two cutting tool inserts are arranged such that their primary cutting edges align with one another and a third cutting tool insert is arranged between these two cutting tool inserts and displaced in relation thereto, namely in the cutting direction. The relation between the widths of the primary cutting edges of the cutting tool inserts and their spacing in the direction parallel to those edges is such that the primary cutting edge of the third cutting tool insert overlaps in extent each of the primary cutting edges of the other two cutting tool inserts.

It is particularly advantageous to construct the two cutting tool inserts whose primary cutting edges are aligned to be triangular and to make the displacement in the cutting direction of the third cutting tool insert in relation thereto less than the value of the altitude dimensions of the triangles. This leads to a particularly compact arrangement of the cutting tool inserts in the holder.

A further advantageous embodiment of the cutting tool of the invention is obtained by providing the cutting tool insert holder with a recess between the cutting tool inserts whose primary cutting edges are aligned for clearing or eliminating the chips or waste material removed from the workpiece by the third cutting tool insert.

The present invention is further manifested by the features that two cutting tool inserts are arranged to have their primary cutting edges in mutually aligned relationship leaving a free space between their ends which is less than the length of their cutting edges and a third cutting tool insert is displaced in the cutting direction between the other two cutting tool inserts such that the longitudinal extent of its primary cutting edge overlaps the longitudinal extent of the primary cutting edges of the other two cutting tool inserts.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various Figures of the drawings there have been generally used the same reference characters to denote the same or analogous components and wherein.

DETAILED DESCRIPTION OF THE PREFERRED EMBODIMENTS

Figure 1:
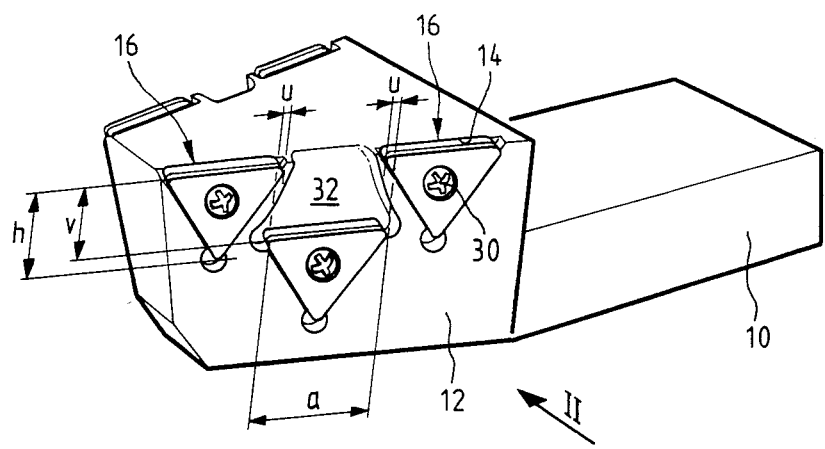
FIG. 1 schematically shows a three-dimensional view of a first embodiment of the cutting tool according to the invention.
Figure 2:
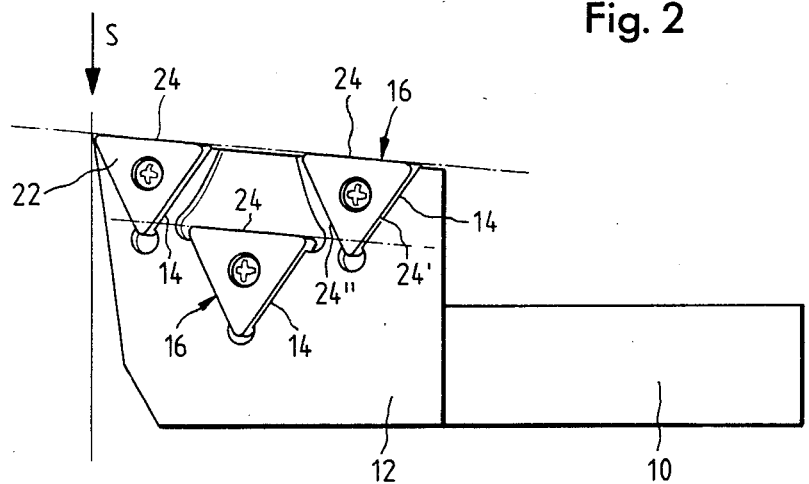
FIG. 2 shows a schematic side view in the direction of the arrow II in FIG. 2.
Figure 3:
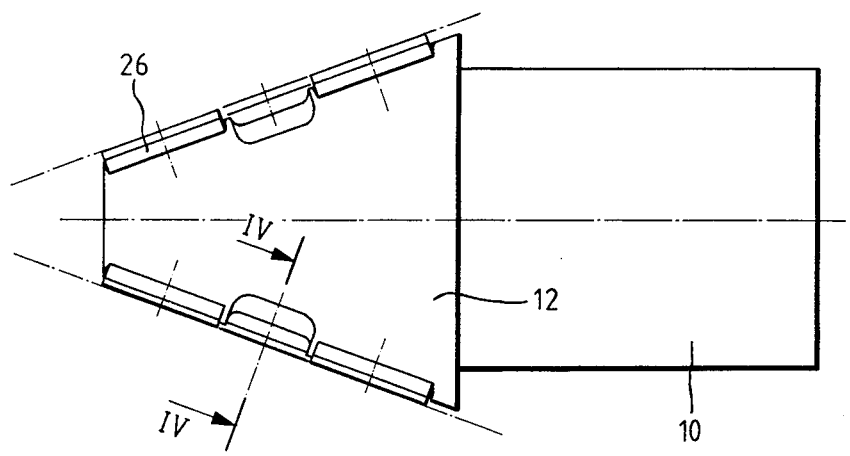
FIG. 3 schematically shows the associated plan view.
Figure 4:
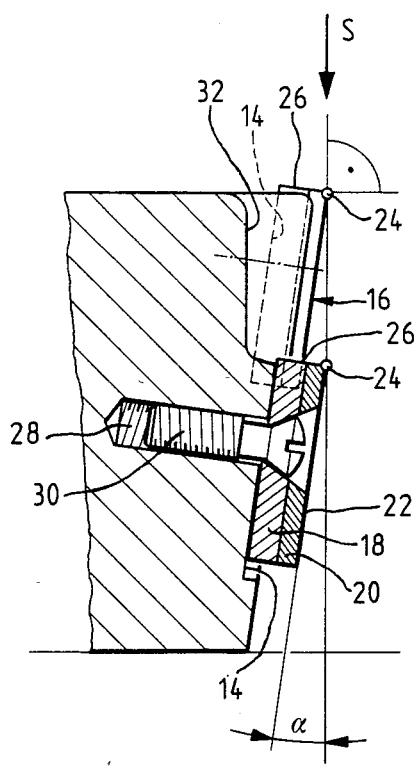
FIG. 4 shows a schematic partial section taken at the line IV—IV in FIG. 3.

Describing now the drawings it is to be understood that only enough of the construction of the cutting tool and its related structure has been illustrated as needed for those skilled in the art to readily understand the underlying principles and concepts thereof, while simplifying the showing of the drawings.

The cutting tool shown in FIGS. 1 through 4 has a shaft or shank 10, one of whose ends forms a cutting tool insert holder 12 comprising three cutting tool insert seats 14 at each side thereof. Two cutting tool insert seats 14 are arranged at each side of the cutting tool insert holder 12 in mutually spaced relationship and at the same height. A third cutting tool insert seat 14 is arranged between them at a lower position.

Each of the cutting tool insert seats 14 is defined by a substantially triangular recess open at the top and accommodates an equilaterally triangular cutting tool insert 16. The cutting tool inserts 16 have flat, parallel major sides in the shape of an equilateral triangle with slightly rounded corners. This triangular shape has a base or side length a and a height or altitude h.

Each of the cutting tool inserts 16 comprises a base or support layer 18 of approximately 4 to 6 mm thickness and a surface or cover layer 20 of approximately 0.8 to 1.0 mm thickness sintered thereupon. The base or support layer 18 is made of hard metal, such as tungsten carbide. The surface or cover layer 20 is made of cubic boron nitride (CBN).

The plane or flat outer surface of the surface or cover layer 20 forms a free face or clearance surface 22 bordered by three primary cutting edges 24, 24' and 24". The narrow sides of the surface or cover layer 20 are each part of a cutting face or surface 26 formed mainly by the base or support layer 18 of the corresponding cutting tool insert 16 and extending substantially perpendicularly to the free face 22.

The free face or clearance surface 22 of each cutting tool insert 16 forms a clearance angle $\alpha$ with the direction of cutting motion S of the cutting tool in relation to the workpiece W. The clearance angle $\alpha$ is the same for all cutting tool inserts 16. One principal cutting edge 24 of each cutting tool insert extending in a direction substantially perpendicular to the cutting motion or direction S is designated as an active principal cutting edge. The other two principal cutting edges 24' and 24" are spares and can be made into active principal cutting edges by removing the corresponding cutting tool insert from its cutting insert seat 14 and rotating it 60° in one direction or the other before replacing it.

The cutting tool insert seats 14 each have a threaded bore 28 extending substantially perpendicular to their seating surface for releasably fastening the cutting tool inserts 16 by means of a screw 30 or equivalent fastening device. The screw 30 penetrates its associated cutting tool insert 16 at the center with radial clearance.

The active principal cutting edges 24 of both of the upper cutting tool inserts 16 are aligned with one another at each side of the cutting tool insert holder 12. The principal cutting edge 24 of the third cutting tool insert 16 is displaced in respect to these cutting edges 24 in the cutting direction S or downwardly in the orientation of FIG. 2. This displacement is appreciably smaller than the altitude h of the triangular shape of the cutting tool inserts 16.

The space between the adjacent ends of the active principal cutting edges 24 of both upper cutting tool inserts 16 is less than the side or base length a of the triangular shape of the cutting tool inserts 16, so that the active principal cutting edges 24 of the three associated cutting tool inserts 16 overlap one another when viewed in the cutting direction S. The overlap u amounts to approximately 1.5 mm.

The clearing or elimination of the chips or waste material removed from the workpiece W by the two upper cutting tool inserts 16 at each side of the cutting tool insert holder 12 takes place of its own accord. In order to avoid difficulties with the clearing or elimination of the chips formed by the lower cutting tool insert 16, a recess 32 is provided in the cutting tool insert holder 12 between the cutting tool insert seats 14 of both upper cutting tool inserts 16. The depth of this recess 32 increases toward the top of the tool holder and such recess 32 extends downwardly to the cutting tool insert seat 14 of the lower cutting tool insert 16.

Figure 5:
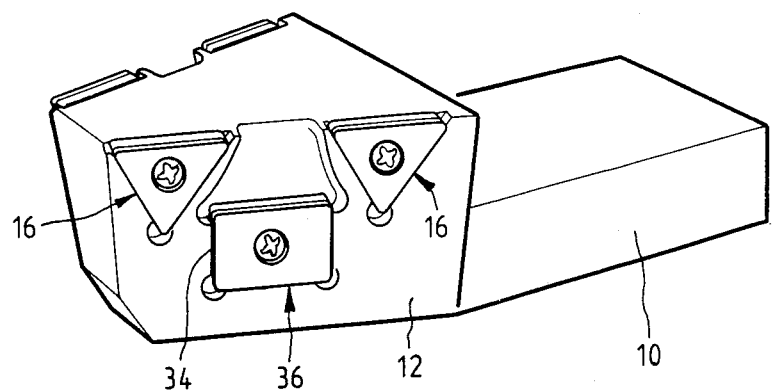
FIG. 5 schematically shows a three-dimensional view of a modified embodiment of the cutting tool according to the invention.

The cutting tool according to FIG. 5 differs from that shown in FIGS. 1 through 4 in that a substantially rectangular cutting tool insert seat 34 is arranged on each side of the cutting tool insert holder 12 between the two triangular cutting tool insert seats 14 instead of a third triangular cutting tool insert seat. This rectangular cutting tool insert seat 34 is displaced downwardly in relation to the two triangular cutting tool insert seats 14. It accommodates a correspondingly substantially rectangular cutting tool insert 36.

Figure 6:
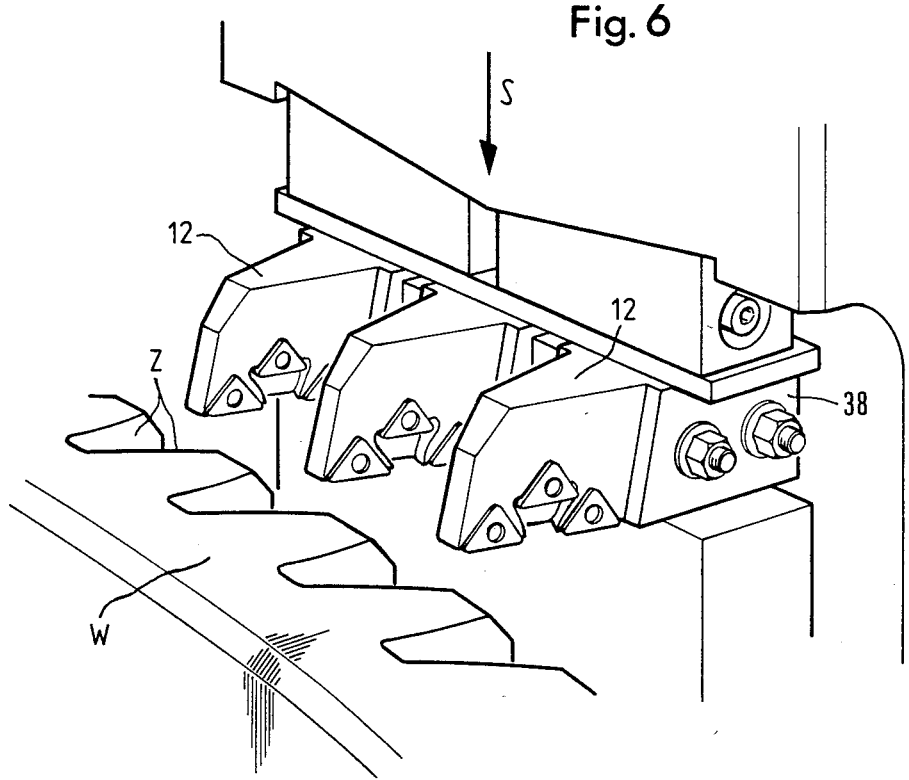
FIG. 6 schematically shows an exemplary application of several cutting tools substantially as shown in FIGS. 1 to 4.

In FIG. 6, parts of a gear planer, shaper or shaver are shown in the process of machining a workpiece W having hardened gear tooth flanks Z. The gear planer or shaver has a tool holder or mounting device 38. Three cutting tools each having a cutting tool insert holder 12 of the type shown in FIGS. 1 through 4 are mounted in this tool holder 38 in adjacent relationship to correspond to the configuration of a straight gear or rack. The active cutting faces or surfaces 26 of all cutting tool inserts 16 face downwardly so that the chips produced can fall away unhindered.

While there are shown and described present preferred embodiments of the invention, it is to be distinctly understood that the invention is not limited thereto, but may be otherwise variously embodied and practiced within the scope of the following claims.

Accordingly, what I claim is:

1. A cutting tool for planing gear tooth flanks on a roughed-out or pre-formed gear blank, comprising:
    a cutting tool insert holder;
    a plurality of cutting tool inserts fastened to said cutting tool insert holder;
    said cutting tool having a cutting direction;
    each of said plurality of cutting tool inserts having a cutting face and a clearance face;
    a junction being formed between said cutting face and said clearance face;
    each of said plurality of cutting tool inserts having an active primary cutting edge formed by said junction of the cutting face and the clearance face thereof;
    each of said active primary cutting edges having a longitudinal extent;
    at least two of said plurality of cutting tool inserts being mutually displaced substantially in said cutting direction such that said longitudinal extents of the active primary cutting edges thereof overlap;
    at least one of said at least two mutually displaced cutting tool inserts being rearwardly displaced in said cutting direction with respect to at least one other of said at least two mutually displaced cutting tool inserts;
    at least one recess provided in said cutting tool insert holder for clearing waste material removed from the gear tooth flanks by said at least one rearwardly displaced cutting tool insert;
    each of said plurality of cutting tool inserts comprising a support layer of hard metal and a surface layer of very hard polycrystalline cutting material sintered thereupon;
    said surface layer having an outer face and at least three side faces;
    said outer face of the surface layer forming said clearance face;
    one of said at least three side faces of the surface layer defining at least part of said cutting face; and
    said longitudinal extents overlapping by not less than 0.5 mm and not more than 6 mm.

2. The cutting tool as defined in claim 1, wherein:
    said longitudinal extents overlap by not less than 1 mm and not more than 2 mm.

3. The cutting tool as defined in claim 1, wherein:
    at least one further cutting tool insert of said plurality of cutting tool inserts is arranged to have said active primary cutting edge thereof in mutually aligned relationship to the active primary cutting edge of said at least one other of said at least two of said plurality of cutting tool inserts and is displaced in said cutting direction in relation to said at least one of said at least two of the plurality of cutting tool inserts such that said longitudinal extent of said further cutting tool insert and said longitudinal extent of said at least one cutting tool insert overlap.

4. The cutting tool as defined in claim 3, wherein:
    at least one of said plurality of cutting tool inserts having substantially mutually aligned active primary cutting edges has substantially the shape of a triangle;
    said triangle having an altitude dimension; and
    said at least one cutting tool insert of said plurality of cutting tool inserts being rearwardly displaced in said cutting direction by an amount less than said altitude dimension.

5. The cutting tool as defined in claim 3, wherein:
    said plurality of cutting tool inserts respectively define a first, intermediate and third cutting tool insert; and
    said at least one recess in said cutting tool insert holder constituting a recess provided between said first and third cutting tool inserts having substantially mutually aligned active primary cutting edges for clearing waste material removed from the gear tooth flanks by said intermediate cutting tool insert which constitutes said at least one rearwardly displaced cutting tool insert.

6. The cutting tool as defined in claim 1, wherein:
    said cutting tool insert holder defines two opposite sides extending in said cutting direction; and
    said plurality of cutting tool inserts being fastened in predetermined groups to said two opposite sides of said cutting tool insert holder.

7. A cutting tool for planing gear tooth flanks on a roughed-out or pre-formed gear blank, comprising:
    a cutting tool insert holder;
    a plurality of cutting tool inserts fastened to said cutting tool insert holder;
    said cutting tool having a cutting direction;
    each of said plurality of cutting tool inserts having a cutting face and a clearance face;
    a junction being formed between said cutting face and said clearance face;

each of said plurality of cutting tool inserts having an active primary cutting edge formed by said junction of the cutting face and the clearance face thereof;

each of said active primary cutting edges having a longitudinal extent;

at least two of said plurality of cutting tool inserts being arranged such that said active primary cutting edges thereof are in mutually aligned relationship and leave a free space therebetween smaller than said longitudinal extent of said active primary cutting edges;

at least a third one of said plurality of cutting tool inserts being displaced substantially in said cutting direction between said at least two of the plurality of cutting tool inserts such that the longitudinal extent of the active primary cutting edge of said third cutting tool insert overlaps each longitudinal extent of the active primary cutting edges of said at least two cutting inserts;

each of said plurality of cutting tool inserts comprising a support layer of hard metal and a surface layer of very hard polycrystalline cutting material sintered thereupon;

said surface layer having an outer face and at least three side faces;

said outer face of the surface layer forming said clearance face;

one of said at least three side faces of the surface layer defining at least part of said cutting face; and said longitudinal extents overlapping by not less than 0.5 mm and not more than 6 mm.

8. The cutting tool as defined in claim 7, wherein:

at least one of said plurality of cutting tool inserts having substantially mutually aligned active primary cutting edges has substantially the shape of a triangle;

said triangle having an altitude dimension; and said at least third one of said plurality of cutting tool inserts being displaced in said cutting direction by an amount less than said altitude dimension.

9. The cutting tool as defined in claim 7, wherein:

said cutting tool insert holder is provided with a recess between said cutting tool inserts having substantially mutually aligned active primary cutting edges for clearing waste material removed from gear teeth by said third cutting tool insert.

10. A cutting tool for planing gear tooth flanks on a roughed-out or pre-formed gear blank, comprising:

a cutting tool insert holder;

a plurality of cutting tool inserts fastened to said cutting tool insert holder with one surface thereof;

each of said plurality of cutting tool inserts having a side surface defining a cutting face and an outer surface opposite said one surface and defining a clearance face;

a junction being formed between said cutting face and said clearance face;

each of said plurality of cutting tool inserts having an active primary cutting edge formed by said junction of the cutting face and the clearance face thereof;

each of said active primary cutting edges having a longitudinal extent;

said cutting tool having a cutting direction;

at least two of said plurality of cutting tool inserts being mutually displaced substantially in said cutting direction such that said longitudinal extents of the active primary cutting edges thereof overlap;

each of said plurality of cutting tool inserts comprising a support layer of hard metal and a surface layer of very hard polycrystalline cutting material sintered thereupon;

said surface layer having an outer face and at least three side faces;

said outer face of the surface layer forming said clearance face;

one of said at least three side faces of the surface layer defining at least part of said cutting face; and said longitudinal extents overlapping by not less than 0.5 mm and not more than 6 mm.

* * * * *